(12) United States Patent
Akers

(10) Patent No.: US 7,897,019 B2
(45) Date of Patent: Mar. 1, 2011

(54) TOWER FOR THE DISTILLATION OF SEAWATER

(76) Inventor: Alan Dayton Akers, Kingsland, TX (US)

(*) Notice: Subject to any disclaimer, the term of this patent is extended or adjusted under 35 U.S.C. 154(b) by 1283 days.

(21) Appl. No.: 12/228,090

(22) Filed: Jun. 26, 2006

(65) Prior Publication Data

US 2010/0032280 A1 Feb. 11, 2010

(51) Int. Cl.
*B01D 3/02* (2006.01)
*C02F 1/14* (2006.01)
*C02F 103/08* (2006.01)

(52) U.S. Cl. .................. 203/10; 159/16.1; 159/17.4; 159/903; 202/185.3; 202/187; 202/234; 203/49; 203/DIG. 1; 203/DIG. 17; 261/153

(58) Field of Classification Search ............... 159/16.1, 159/17.4, 903; 202/185.3, 187, 234; 203/10, 203/49, DIG. 1, DIG. 17; 261/153
See application file for complete search history.

(56) References Cited

U.S. PATENT DOCUMENTS

| | | | |
|---|---|---|---|
| 4,080,186 A | 3/1978 | Ockert | |
| 4,110,172 A * | 8/1978 | Spears, Jr. | 202/234 |
| 5,553,456 A | 9/1996 | McCormack | |
| 5,614,066 A | 3/1997 | Williamson | |
| 5,744,008 A | 4/1998 | Craven | |
| 6,440,275 B1 * | 8/2002 | Domen | 202/234 |
| 6,574,979 B2 | 6/2003 | Faqih | |
| 6,663,694 B2 | 12/2003 | Hubbard et al. | |
| 7,328,886 B2 * | 2/2008 | Mockry et al. | 261/112.1 |
| 7,381,310 B2 * | 6/2008 | Hernandez Hernandez et al. | 202/176 |
| 2004/0026225 A1 * | 2/2004 | Domen | 203/23 |
| 2004/0211184 A1 * | 10/2004 | Bharathan et al. | 60/651 |
| 2005/0258556 A1 * | 11/2005 | Bosman | 261/30 |

OTHER PUBLICATIONS

Large Scale Dew Collection as a Source of Fresh Water, *Desalination*, vol. 36, Mar. 1981, pp. 299-306. Anil K. Rajvanshi.

Chemical Engineers' Handbook, 5th Ed., McGraw-Hill Perry/Chilton, pp. 12-4,5;16-17; 14-13,14;20-6,7.

* cited by examiner

Primary Examiner—Virginia Manoharan (57) ABSTRACT

Systems and methods for desalting seawater by distillation are disclosed. Warm air is fed into the bottom of a natural draft tower. The warm air passes through seawater in an exchange means to increase the water content of the air. The moisture-laden air then rises and is drawn through a condensing means. The condensing means is cooled by cold water drawn from deep ocean depths. Desalted seawater is collected from the condensing means.

2 Claims, 6 Drawing Sheets

TOWER FOR THE DISTILLATION OF SEAWATER

BACKGROUND OF THE INVENTION

Field of the Invention

The invention relates to a large two-chamber natural draft tower in which warm air is passed through seawater in a gas-liquid exchanger. The warm moisture-laden air rises and passes through a condenser cooled by cold deep seawater. Freshwater is collected from the condenser. Pumps are needed to supply seawater for the gas-liquid exchanger and to supply the cold deep seawater to the condenser.

It is commonly known that as populations grow, there is more pressure on fresh water resources. No where is that more apparent than in the southwestern region of the United States. Now water shortages are looming on the horizon.

A headline in the Aug. 24, 2003 Austin American-Statesman reads: "The Battle for West Texas Water". Fresh water isn't just a problem in Texas. Explosive growth in Las Vegas produces the same problem. Hoover Dam no longer generates power because water is more precious than electricity. Attempts to develop housing in Baja Calif. face a water crisis, and a barrel of water is reputed to be worth more than a barrel of oil in some locations.

Of course, North America isn't the only part of the world having water problems. A sweeping UN report in 2003 warned of a global water crisis from population growth, pollution, and climate change. The report predicted that the average water supply per person would fall by one-third within 20 years. China, the Mid-East, Africa, indeed, nearly every part of the world within a few thousand miles of the equator could benefit from more fresh water.

The irony is that there is plenty of water in the world. Indeed, most of the surface of the earth is covered by water. The problem, of course, is that it is poisonous to land-life. To make it suitable for land-life consumption, we must rely on a fickle Mother Nature to provide us water in abundant quantities. We must wait for quantities of warm moist air to come in contact with cold air to produce rain.

The growing need for fresh water is well known. As the world population grows, the need for fresh drinking water grows. In addition, there is a growing need for agricultural water. Laws, mismanagement, and pollution have placed an ever-increasing burden on the fresh water supply. Nearly every country in the world could use and needs more fresh water.

In many places, there is ocean water next to deserts. Some places have experimented with growing crops using reduced saline content water. That is, they have lowered the salt content of the water by partly removing the salt, or they have added a portion of fresh water. Only a few crops can tolerate these conditions. This still leaves the problem of water for humans and animals. For years, there has been a quest to produce potable water from sea-water at a reasonable cost.

SUMMARY OF THE INVENTION

According to the present invention, a two-chamber, natural draft tower having an opening for incoming air rises through one chamber containing an air-liquid exchange zone to increase the moisture content of the air. Subsequently, the moisture-laden air is discharged into a second chamber containing a condensing exchanger whereby the temperature is lowered, precipitating the moisture before discharging cool dry air outside the tower.

The two-chambered, natural draft tower may be configured as a coaxial tower, a split tower, or an inverted U-shaped structure. In the coaxial tower, warm air enters the outer annular chamber and rises through the air-liquid exchanger that is fed with seawater. Moisture-laden air rises to top of the tower, then descends in the core-condensing chamber to a condenser cooled by water pumped from deep ocean depths. Fresh water is collected from the condenser.

The split tower has a center wall rising part way up the tower to make two chambers, each with a cross-sectional area of one-half the tower. Warm air is introduced into one side of the tower and rises through an air-liquid exchanger producing warm moisture-laden air. The warm moist air rises to the top of the tower, then descends to the condensing means to remove the moisture from the air. The condensing means is cooled by water pumped from deep ocean depths.

In the inverted-U configuration, one arm is the warm air chamber, and the other arm is the cold air chamber. Heated air is introduced into the warm air chamber and rises through an air-liquid exchanger fed with salt water. Warm moisture-laden air rises to the top of the arm and is drawn into the cold air chamber where it passes through a condensing means, causing the moisture to precipitate before it exits as cool dry air.

The air-liquid exchanger may be any of the known configurations, such as a packed column or one or more bubble plates. The condensing exchanger may be any of the known designs.

For greater efficiency, the air entering the first chamber containing the air-liquid exchanger may be heated by the sun. Also, the temperature of the seawater may be raised by a holding period in a settling pond. Increasing the temperature of both of these variables will reduce the number of bubble plates required or reduce the length of the packed column.

The condensing exchanger is cooled by pumping water from a deep ocean source. For example, according to the National Oceanographic Data Center in Silver Spring, Md., at 3 kilometers, the coastal south Atlantic will have temperatures ranging from 7° C. to −3° C. An insulated pipe or tube supplying the deep ocean water is used to reduce temperature loss prior to entering the second chamber housing the condensing exchanger. The rate of cold water flow depends on the temperature drop across the exchanger.

An enhancing feature is a solar heating chamber. The inlet to the first chamber containing the air-liquid exchanger may be fitted with a solar chamber designed to heat the incoming air well above the ambient air temperature. In the Northern Hemisphere, the solar chamber comprises a semicircle around the base of the south side of the tower. In the Southern Hemisphere, the solar chamber would be on the north side of the tower. The cross sectional area of the chamber is at least as great as the cross sectional area of each of the tower chambers to prevent flow restriction.

Preferably, the tower is built on an elevation so that the solar chamber is at an angle mean between the maximum and minimum solar incident radiation throughout the year. That is, the angle of the chamber is such that at the equinox, solar radiation is perpendicular to the surface of the chamber.

The chamber is made according to known technology using glass and black, heat absorbing metal surfaces. A longer chamber with baffles will allow the residence time to increase allowing higher air temperatures.

In operation, cold deep seawater is pumped through the condensing chamber exchanger, causing the temperature to decrease thereby producing a slightly lower pressure. The lower pressure will draw the air from the evaporation chamber and the solar chamber. The surrounding ambient air is drawn through the solar chamber increasing the temperature, which will cause a slight increase in the pressure. The heated air passes through the air-liquid exchanger producing moisture-laden air that rises in the tower to the dome then falls through the second chamber having the cold seawater chilled exchanger. As the moisture-laden air passes the cold seawater chilled exchanger, the air temperature drops reducing the pressure of the air. This reduced pressure causes warm air from the first chamber to flow through to the second chamber. The air is cooled below its prior dew point, and substantially fresh water precipitates and collects below the condensing exchanger.

While it is important to warm the incoming air to a temperature that will hold the most water, it is more important to chill the moisture-laden air to the lowest temperature possible to extract the water. To do this in the most economical manner, one must look to what the environment offers. Solar heating of air is reasonably inexpensive once the apparatus is in place. Part of the problem in the past was a heavy reliance on heating non-potable water to a temperature where it would evaporate at a high enough rate to produce an economical supply of potable water. The present approach focuses on heating and cooling large volumes of air to absorb and precipitate relatively small amounts of water.

Heating and evaporation of the water can be enhanced by pumping seawater into a shallow solar-settling pond prior to introduction into the evaporation means in the tower. This can allow other economies by selling the salts collected as by-products.

Refrigeration is an important factor in the operation of the towers. Economical refrigeration is key to the production of an inexpensive water source. An economical refrigerant can be found at great ocean depths. The National Oceanographic Data Center in Silver Spring, Md. charts water temperatures in the range of −0.5 to 7 degrees Celsius (° C.) at depths of 3,000 meters and below in the equatorial Atlantic and Pacific Oceans. Water temperatures in the range of 3° to 16° C. are found at depths of 1,750 meters and below in the Mediterranean Ocean, and water temperatures in the range of −1.5° to 7° C. are found at depths of 4,000 meters and below in the Persian Gulf.

This cold deep water can be brought to the surface in a pipe or tube and used as a refrigerant. To conserve the low temperatures, an insulated pipe or tube can be used, keeping the temperature drop of the water between the entrance and the discharge within a few degrees. Power requirements to use this cold water would only require a pump large enough to raise the water from the ocean surface and force it through the condensing exchanger at the necessary rate.

Likewise, input water may be pumped from the surface of the ocean directly to the air-liquid exchanger. Alternatively, to increase the efficiency, the input water can be stored in solar-settling ponds to warm prior to being fed to the exchanger. Power requirements for the input water would require a pump large enough to raise the water to the air-liquid exchanger at the necessary rate.

Description of the Prior Art

U.S. Pat. No. 5,744,008 teaches a dome-shaped hurricane tower. The dome and outer walls of the tower are cooled by seawater siphoned from a depth of 2,000 feet. A central rotor spins providing a vortex to raise the moist air towards the domed ceiling whereby it condenses on the cold surface and runs down the sides and is collected. The height of the tower is limited by the unassisted siphoning of the cold seawater to a height of no more than 30 feet. The diameter is limited by the ability of the spinning central rotor to produce hurricane winds, viz., 75 to 150 miles per hour. Generally, the diameter is about 20 feet. The device produces 0.73 liters of potable water/second when the surface water vapor is 25° C., and 11.33 liters/second when the water is heated to 71° C.

U.S. Pat. No. 5,614,066 teaches a water distillation apparatus comprising two polyvinyl chloride (PVC) tube horizontal housings connected by a third PVC tube. Hot water from a solar heater, electric, gas, or diesel generator is introduced into one of the housings where vapor is swept into the cooler end and into the second housing where a counter-flow heat exchanger condenses the vapor. Cold seawater is used in the heat exchanger.

U.S. Pat. No. 6,574,979 B2 teaches a means for collecting fresh water from hot humid air. Primarily, thermoacoustic refrigeration is used to cool fresh water circulating in pipes to cool surfaces below the dew point of humid air to produce potable water. One of the several devices disclosed that could be used on seagoing ships uses deep seawater for cooling. There is mentioned, also, that cold deep-sea water is used for cooling condensation coils in St. Croix, the Virgin Islands.

U.S. Pat. No. 6,663,694 B2 teaches water recovery from cooling tower effluent. Hot or warm water is sprayed on an evaporative media that produces moisture-laden air that rises to air-to-air heat exchanger packs higher up the tower. Various dampening configurations are possible to assist the various heat and mass loads in the tower. If ocean water is available, it can be used to cool the incoming air in the cold passageway of the heat exchanger, increasing the condensation of the water vapor in the tower.

Those skilled in the art understand that other configurations of various structures described hereafter are possible without departing from the spirit and scope of the present invention.

DETAILED DESCRIPTION OF PREFERRED EMBODIMENTS OF THE INVENTION

Coaxial Tower

Figure 1:
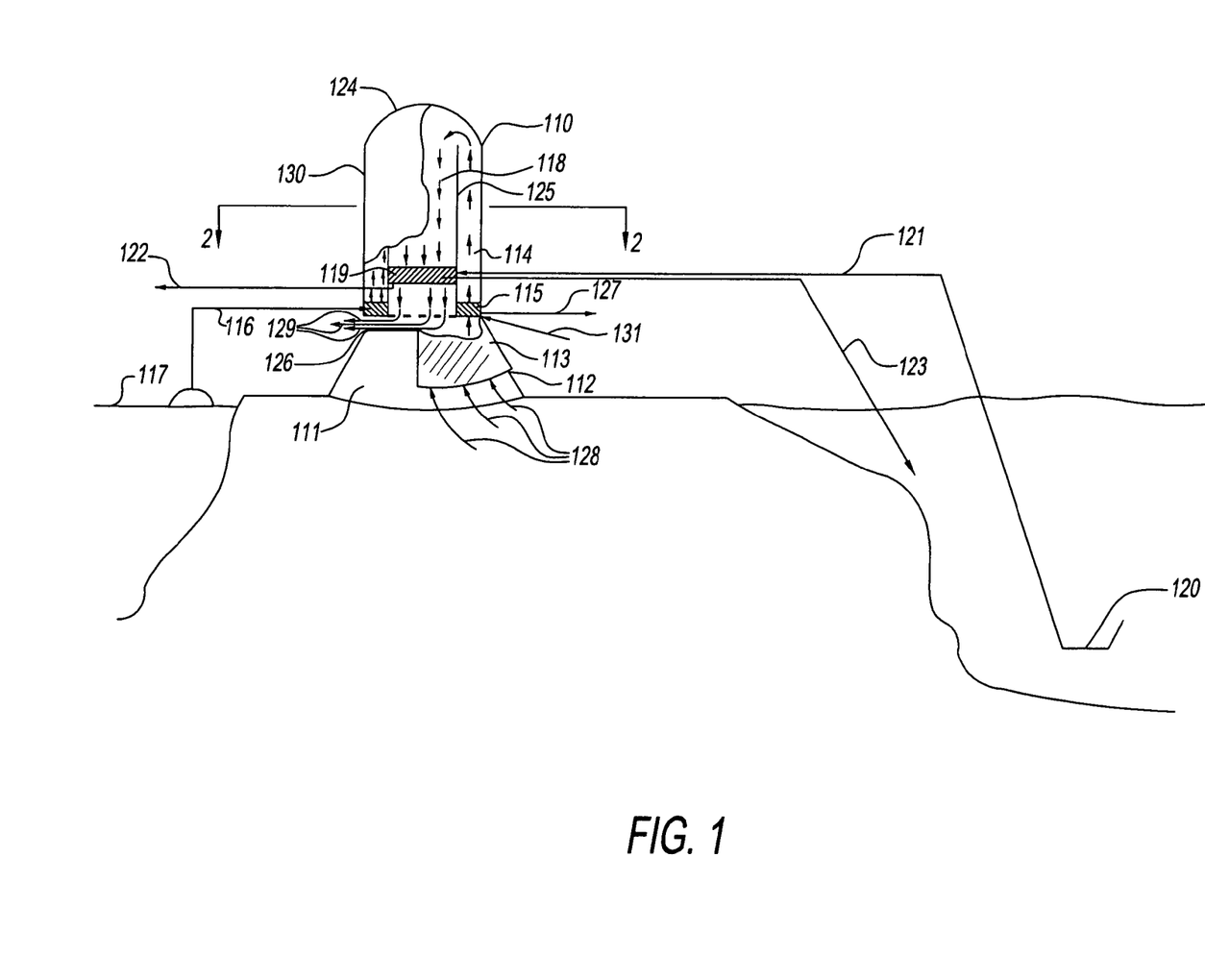
FIG. 1 is a side elevation view of a natural flow tower with portions exploded showing concentric chambers for heating and cooling vapors from saline or brackish water.

Referring to FIG. 1, tower 110 is built on elevated earth mound or structure 111. Concentric two-chamber natural draft tower 110 comprises outer wall 130 and dome 124 with opening 126 at the bottom to allow air to discharge. Air enters opening 112 and is heated in solar chamber 113 before passing into outer annular chamber 114. Inner wall 125 is open at the top to allow moisture-laden air from annular chamber 114 to flow into core chamber 118. Annular chamber 114 contains air-liquid exchange means 115 that has saline water feed 116 from source 117. Excess saline feed water to air-liquid exchanger 115 is removed through discharge line 127 and is returned to either a solar settling pond or to its source body of water. Air heated in solar chamber 113 passes up through air-liquid exchange means 115, becoming highly saturated with water.

Warm moisture-laden air rises to the top of outer annular chamber 114 and passes into core chamber 118 and through condensing means 119. Condensing means 119 is cooled by drawing very deep seawater 120 through supply 121. As moisture-laden air in chamber 118 passes through condensing means 119, water having substantially reduced salinity is precipitated and collected from supply line 122. Cooling water from condensing means 119 can be discharged back into the ocean through supply line 123 or it can be discharged into a settling pond for later feed to air-liquid exchanger 115. A section of inner-wall 125 and a section of outer wall 130 are open at the bottom to discharge cooled air. Opening 126 in inner wall 125 and in outer wall 130 is on the opposite side of tower 110 from opening 112 for solar chamber 113. Floor 131 between inner wall 125 and outer wall 130 seals outer annular chamber 114 from the discharging air. Arrows 128 depict incoming ambient air and arrows 129 depict exiting cooled air.

Figure 2:
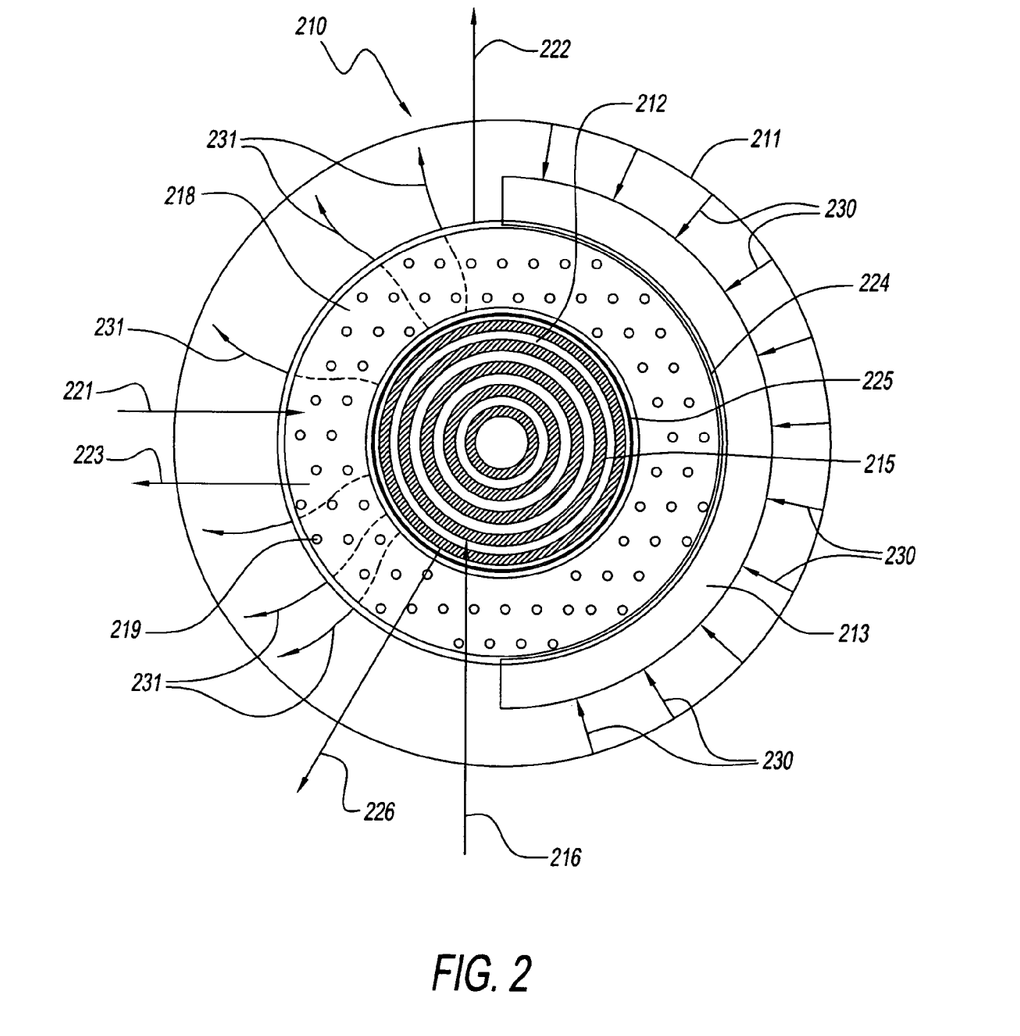
FIG. 2 is a cross-sectional view of tower in FIG. 1 taken along lines 2-2 showing the concentric chambers for heating and cooling moisture-laden air.

FIG. 2 is a cross sectional view of the natural flow tower in FIG. 1 taken along lines 2-2. Natural Flow tower 210 rests on an elevated earth mound or elevated structure 211. Inner wall 225 forms core chamber 212 housing condensing means 215. Inner wall 225 and outer wall 224 form outer annular chamber 218 housing air-liquid exchange means 219. Solar chamber 213 skirts the bottom of the tower substantially around one-half the base. This provides maximum exposure from sunrise to sunset. Saline water is introduced to air-liquid exchange means 219 by supply line 221. Excess saline feed water to air-liquid exchanger 219 is removed through discharge line 223.

Cold deep ocean water is supplied to condensing means 215 by supply line 216. After the cold deep ocean water has circulated in condensing means 215 for a predetermined time, it is discharged in line 226. Fresh potable water is recovered from condensing means 215 by line 222. Air cooled by condensing means 215 is discharged through openings in inner wall 225 and outer wall 224 on the opposite side of tower 210 from solar chamber 213. Arrows 230 depict incoming ambient air, and arrows 231 depict exiting cooled air.

Inverted-U Tower

Figure 3:
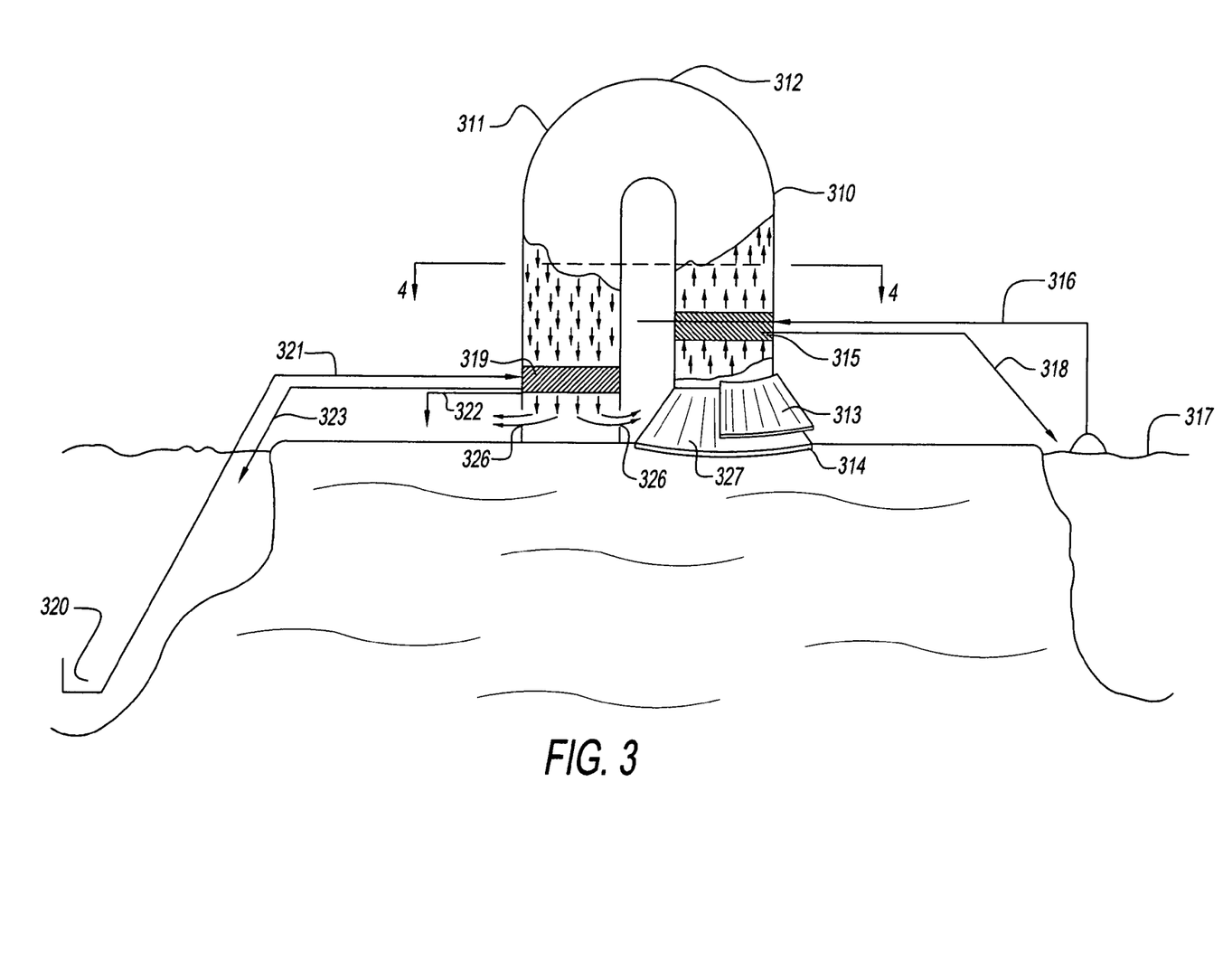
FIG. 3 is a side elevation view of an inverted-U configuration of a two-chamber natural flow tower with portions exploded showing a heating chamber for producing moisture-laden air, and a cooling chamber for condensing the water from the moisture-laden air.

Referring to FIG. 3, two towers 310, 311 have connecting portion 312 of size common to each tower forming an inverted-U structure. Tower 310 is the evaporative tower where saline water from source 317 is pumped through supply line 316 to air-liquid exchange means 315. Excess saline feed water to air-liquid exchanger 315 is removed through discharge line 318 and is returned to either a solar settling pond or to its source body of water. Evaporative tower 310 is built on an elevated earth mound or elevated structure 327. Ambient air is drawn into opening 314 at the bottom of solar heating means 313, and passes up through air-liquid exchange means 315. Highly saturated warm air rises in tower 310, then passes through connecting portion 312 into condensing tower 311.

Condensing means 319 draws its refrigerant from cold deep ocean water 320 through supply line 321. After cold deep-ocean water 320 has been in condensing means 319 for a predetermined time, it is discharged through line 323 back into the ocean. In the alternative, the refrigerant cold deep-ocean water can be discharged into a solar settling pond for use as feed for air-liquid exchanger 315. Fresh potable water is collected from condensing means 319 and discharged through line 322. Cool dry air exits condensing tower 311 through opening 326 that may extend for a portion or the entire circumference of tower 311. Opening 326 must be large enough that the cool dry air can exit freely without any pressure buildup.

Figure 4:
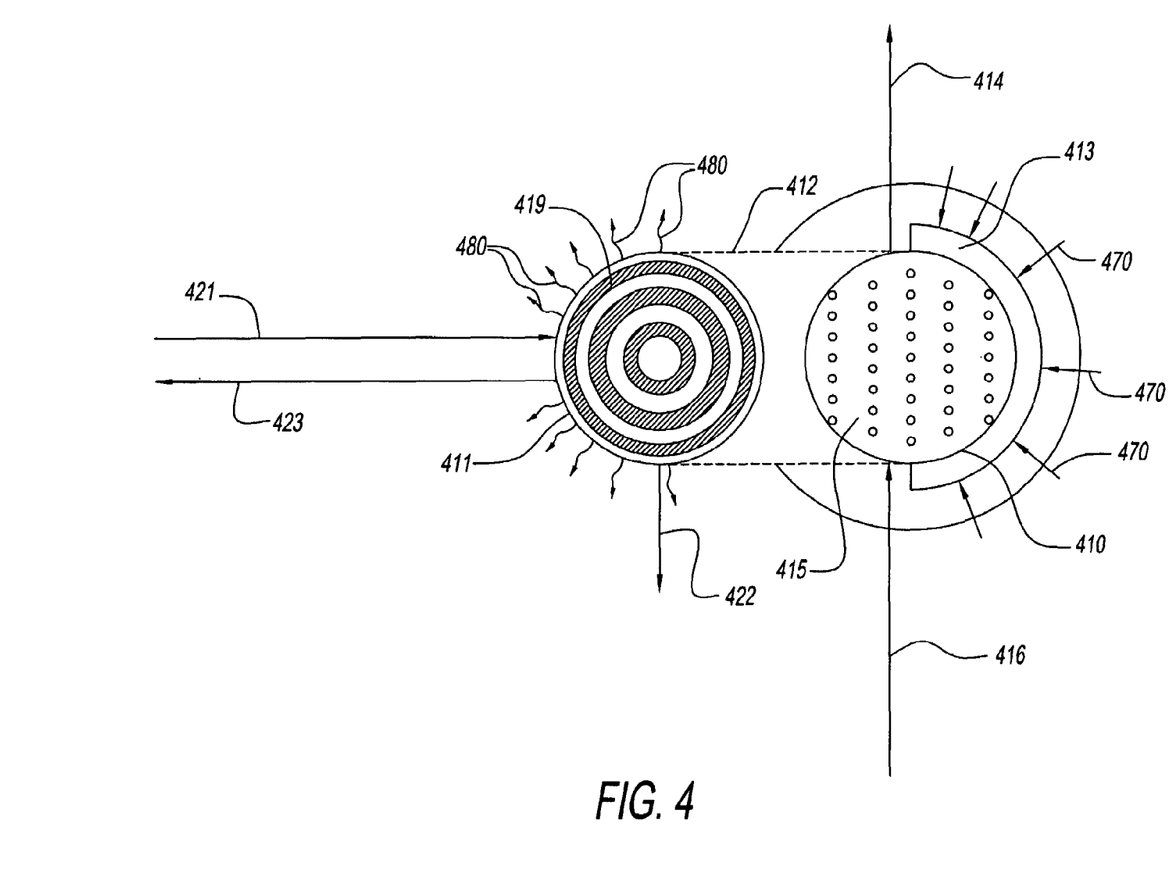
FIG. 4 is a cross-sectional view of the inverted-U tower in FIG. 3 taken along lines 4-4 showing the evaporative chamber and the condensing chamber.

FIG. 4 is a cross-sectional view of natural flow towers 310, 311 taken along lines 4-4 in FIG. 3. Towers connecting portion 412 above lines 4-4 is outlined with dash lines. Numerous arrows 470 denote the ambient air entering tower 410 through solar heating means 413. Saline water is fed through supply line 416 to air-liquid exchange means 415 depicted as a bubble plate. Excess saline feed water to air-liquid exchanger 415 is removed through discharge line 414 and is returned to either a solar settling pond or to its source body of water. Ambient air 470 is heated and passes up through air-liquid exchange means 415, absorbing water in said exchange means. The moisture-laden air rises to the top of tower 410, passing through connecting portion 412 into tower 411. Cold deep-ocean water is drawn through supply line 421 and passes through condensing means 419. After a predetermined time in condensing means 419, the ocean water is discharged through line 423 either back into the ocean or into a solar settling pond that can provide feed for air-liquid exchange means 415. Fresh potable water is drawn off in line 422 from condensing means 419. Cool, dry air is discharged from tower 411 depicted as arrows 480.

Split Tower

Figure 5:
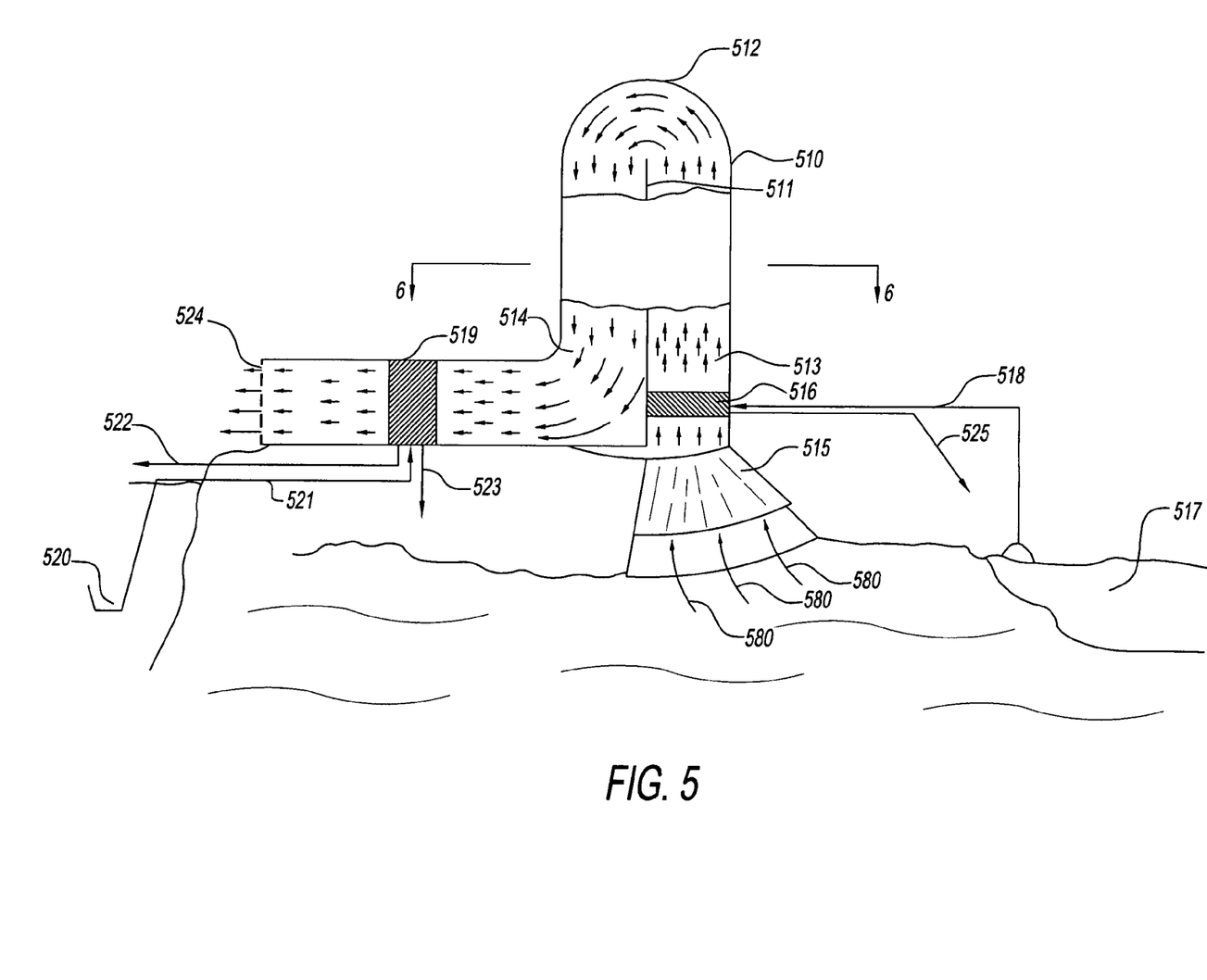
FIG. 5 is side elevation view of a split tower configuration with portions exploded showing the heating and cooling chambers in a natural flow tower for the desalination of water.

FIG. 5 shows partitioned tower 510 having common center wall 511 dividing the tower in half with equal cross-sectional areas, evaporative chamber 513 and condensing chamber 514. Dome 512 encloses the top of tower 510 and provides access to evaporative chamber 513 with condensing chamber 514.

Tower 510 is elevated to provide a slanted surface for solar heating surface 515. Air-liquid exchanger 516 is situated near the base of evaporator chamber 513, and draws water from salt-water source 517 through supply line 518. Excess saline feed water to air-liquid exchanger 516 is removed through discharge line 525 and is returned to either a solar settling pond or to its source body of water.

Condensing means 519 draws cooling water from deep ocean source 520 through supply line 521. Excess and spent cooling water from condensing means 519 can be discharged back into the ocean through supply line 522, or it can be discharged into a settling pond for later feed to air-liquid exchanger 516. Potable water is collected and discharged through line 523.

In operation, ambient air depicted by arrows 580 is drawn in through solar heater 515 and passes up through air-liquid exchanger 516 to become warm and highly moisture-laden. The moist air rises to the top of evaporative chamber 513, passing over center partition 511 in dome 512 into condensing chamber 514. The moisture-laden air is drawn into condensing means 519 whereby the moisture is precipitated and collected. Cool dry air is discharged through opening 524, and may be used for other cooling purposes or discharged to the air.

Figure 6:
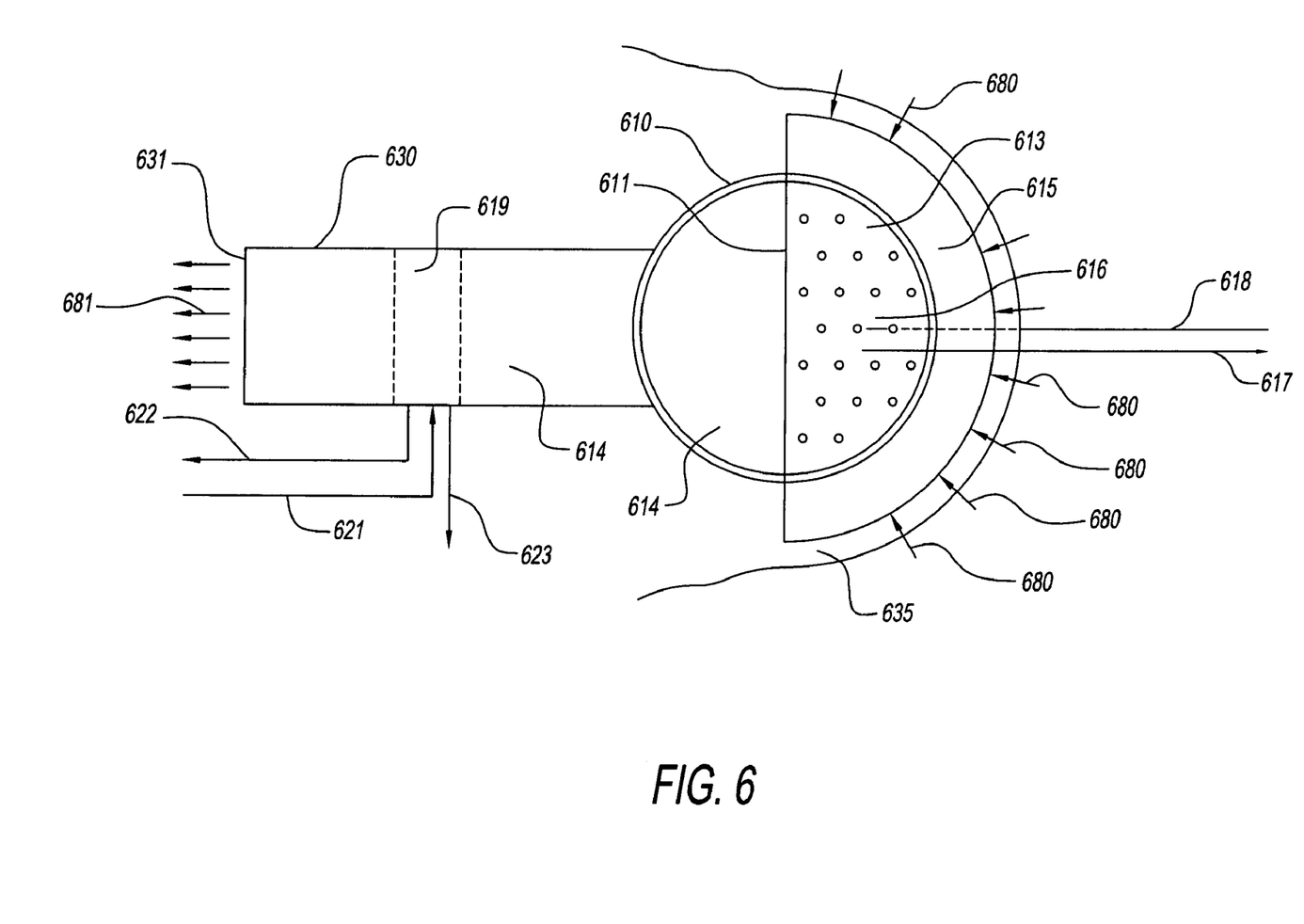
FIG. 6 is a cross-sectional view of a natural flow split tower in FIG. 5 taken along lines 6-6 showing a chamber for vaporizing saline water and a chamber for condensing the vaporized water.

Referring to FIG. 6, tower 610 has partition 611 dividing the tower into two equal sections. Evaporator section 613 is depicted as having bubble plate air-liquid exchanger 616. Exchanger 616 is fed salt water through supply line 618. Excess saline feed water to air-liquid exchanger 616 is removed through discharge line 617 and is returned to either a solar settling pond or to its source body of water. Condensing section 614 comprises the other half of the tower where condensing means 619 is located in exit tube 630. Condensing means 619 is cooled by deep ocean water pumped through supply line 621. Excess and spent cooling water from condensing means 619 can be discharged back into the ocean through supply line 622, or it can be discharged into a settling pond for later feed to air-liquid exchanger 616. Potable water is drawn off through line 623.

Solar heater 615 skirts the base of evaporator section 613. The tower is built on a raised structure or earth works 635 to allow solar heater 615 to slant at the optimum angle for heating.

In operation ambient air depicted by arrows 680 enters solar heater 615 and rises through air-liquid exchanger 616 to evaporate water supplied to the exchanger through supply line 618. Warm moist air rises in evaporator section 613 to the top of the tower, and enters condensing section 614. Condensing means 619 is cooled by deep-ocean water through supply line 621. The moisture-laden air is cooled by condenser 619, and potable water precipitates and is drawn off through line 623. Spent or excess cooling water is returned to its source through line 622. Dry cool air 681 is discharged to the atmosphere through opening 631.

There are several beneficial alternatives that those skilled in the art can readily see. For example, the spent or excess cooling water can be diverted to a settling pond for solar heating before being fed to the air-liquid exchanger. Also, if there are office, factory, or residential facilities nearby, the dry cool air discharge can be used as air-conditioning source.

Gas-Liquid Evaporator System

There are several air-liquid exchangers known in the art that are suitable for use in this invention. Chief among the air-liquid exchangers are the sieve or perforated plate, the bubble-cap plate, and the packed column. More details of these methods of liquid-gas systems can be found in *Chemical Engineer's Handbook*, Perry & Chilton, Fifth Edition, pages 18-1 to 18-58, and is incorporated herein. The length of the packed column or the number of bubble plates will be dictated by the requirement to bring the incoming heated air to as close to 100% saturation as possible.

All these types of exchangers are going to foul with salt and mineral debris, requiring periodic flushing to keep the tower operating at a reasonable efficiency. If water supply is critical, the construction of more than one tower would permit continued operation while one was closed or down for maintenance.

Alternative Heat Source

Certainly, it is within the contemplation of this invention to use heat from any large heat source. For example, spent cooling water from large power plants could be used as a source of feed water for the air-liquid evaporator.

Cooler/Condenser

There are numerous designs for condensers known to those skilled in the art that are suitable for use in this invention. Typical designs that may be used are shell and tube exchangers and plate-fin exchangers. In the shell and tube exchanger, for example, the shell is the sides of the tower, and with the plate-fin exchanger, the plate is the sides of the tower. A general discussion of several of these designs are set forth in *Chemical Engineer's Handbook*, Perry & Chilton, Fifth Edition, Pages 11-3 to 11-23 and is incorporated herein.

Selection of the particular design will depend on the tower size, cold-water temperature, and throughput of the process. The length of the condensing unit should be long enough to give the moisture-laden air enough residence time to reduce the moisture content to as close to 0% as possible. Of course, economics will dictate many of the parameters.

Solar Heated Chamber

The tower is built on either a raised earthen mound or on an elevated structure. This will permit the construction of a solar heated chamber 180° around the base of the tower which will give some heat energy from early sunrise to late sunset.

The elevation of the tower will permit angling the face of the solar chamber to be nearly perpendicular to the sun's rays in the winter when heating would be less intense. Of course, if water requirements were more critical in the summer months, then the face of the chamber could be built to angle perpendicular at the equinox, receiving more direct radiation during the warmer months.

There are numerous solar heater designs that can be used. Probably the simplest is a glass or clear plastic cover with a black conductive metal underneath. Baffles and fins can be used to provide more air-surface contact and increased residence time.

A table showing maximum expected solar radiation at various north latitudes can be found in *Chemical Engineer's Handbook*, Perry & Chilton, Fifth Edition, page 12-21 and is incorporated herein.

Tubes and Pipes

Much of the tubing or piping leading into the evaporator or condenser can be polyvinyl chloride (PVC) piping because the system as a whole does not require high pressure fluids. This will reduce the problems of corrosion by the saltwater.

The pipe drawing the cold deep ocean water is preferably insulated to keep the efficiency of the temperature differential at a maximum. However, if the flow rate is high, the expense of insulation may not be cost effective.

An optimizing feature for the tower is to replace a portion of the outer wall with structural glass. This would be placed on the south side of the tower in the northern hemisphere and on the north side in the southern hemisphere, beginning at the base below the air-liquid exchanger and extending up to 100 feet above the exchanger. This helps maintain or increase the temperature of the water vapor coming off the exchanger during peak sun radiation. An insulated cover is placed over the glass when the radiation wanes so that unnecessary atmospheric cooling won't further degrade the performance of the tower.

EXAMPLE

Those skilled in the art are familiar with the gas law equation. $PV=nRT$ where P is the pressure of the gas, V is the volume of the gas, n is the molecular weight of the gas. R is a constant value, and T is the temperature of the gas. It is assumed that the volume of air passing through the evaporator section is the same as that passing through the condensing section, that is, air coming into the tower must be the same as the amount of air exiting the tower. Thus, when the gas conditions in the evaporating section of the tower are compared to the gas conditions in condensing section the volume of air in the system, and molecular weight of the gas and the gas constant are the same. This leaves only temperature and pressure to consider, or $P_\theta/P_c=T_\theta/T_c$, that is, pressure ($P_\theta$) in the evaporator section divided by the pressure ($P_c$) the condenser section is equal to the temperature ($T_\theta$) the evaporator section divided by the temperature ($T_c$) in the condenser section.

Assuming the pressure of the incoming air for the evaporator ($P_\theta$) is at atmospheric pressure, i.e., 14.7 pounds per square 8 inch, and the incoming air temperature for the evaporator is 38° C. and the air exiting from the condenser is 4° C., changing these values to the Kelvin scale, they become 311° K. and 276° K. respectively, and the pressure in the condensing section becomes approximately 13 pounds per square inch. Thus, a pressure differential of 1.7 pounds/sq. in. is achieved with a 35° K. temperature differential. This temperature and pressure differential provides the natural draft for the tower.

The mean velocity of air flowing above the packing in a natural draft tower is between 4 feet/second and 6 feet/second. In a tower having a cross-section area of 31,416 square feet, a flow rate of approximately 125,664 cubic feet/second or 10,153 pounds of air/second can be achieved.

Air at 100° F. and 90% humidity has approximately 0.0385 pounds of water/pound of dry air. Even at 50° F. and 10% humidity, air has approximately 0.00075 pounds of water/pound of dry air. Saturating 100° F. air to 90% humidity and cooling it to 50° F. to bring the humidity down to 10% produces 0.03775 pounds of water/pound of dry air.

With a flow rate of 10,153 pounds of air/second producing 0.03775 pounds of water/pound of dry air, approximately 383 pounds of water is produced or 46 gallons/second. With these high flow rates, slight improvements such as increasing the incoming air temperature will dramatically increase production of water. For example, if incoming air temperature is warmed to 120° F. and is saturated to 90% humidity, it carries 0.073 pounds of water/pound of dry air. That is more than double the amount of water air will hold at 100° F. A 20° F. difference can increase production by as much as 30 gallons/second, a 65% increase. Doubling the cross-sectional area of the tower will approximately double the output of the system.

Numerous variables, such as location, time of year, temperatures achieved and size of tower can be changed to optimize the system.

I claim:

1. A natural draft tower having two contiguous open chambers for desalting seawater by distillation comprising:
   (a) a semicircular solar air heating means vertically angled around the base of a first chamber and having a cross sectional area at least as great as the cross sectional area of said first chamber and of a second chamber having two openings and an inclined surface perpendicular to solar radiation at equinox,
   (b) and means for feeding heated air through an air-liquid exchange means in said first chamber to produce a moisture-laden air flow through a second opening of said first chamber contiguous with a first opening in said second chamber,
   (c) said first chamber with a surrounding wall having two openings and having an inlet for said solar air heating means at the base and having an air-liquid exchange means within said chamber with a first opening in said wall below said exchange means and contiguous with one of said openings of said solar air heating means,
   (d) said second chamber with a surrounding wall having two openings wherein the first opening is open and contiguous to the second opening of said first chamber and having a condensing means and an air discharge opening, and
   (e) tubular means connected to said condensing means and extending to an ocean depth where ocean water is less than 7° C.

2. A method for desalting seawater in a natural draft tower having two open contiguous chambers comprising:
   (a) introducing ambient air into a semicircular solar heating means vertically angled and fitted to the base of a first chamber to heat said ambient air above it's incoming temperature,
   (b) feeding seawater to a water evaporation means in said first chamber,
   (c) passing said heated air through said water evaporation means in said first chamber to produce moisture-laden air which flows through a second opening of said first chamber contiguous with one opening in a second chamber,
   (d) drawing deep-ocean water of less than 7° C. and passing said water through a condensing means in said second chamber contiguous with said first chamber,
   (e) channeling said moisture-laden air through said condensing means to produce fresh water,
   (f) collecting said fresh water, and
   (g) expelling cooled air outside through a second opening in said second contiguous chamber.

* * * * *